Patented July 1, 1930

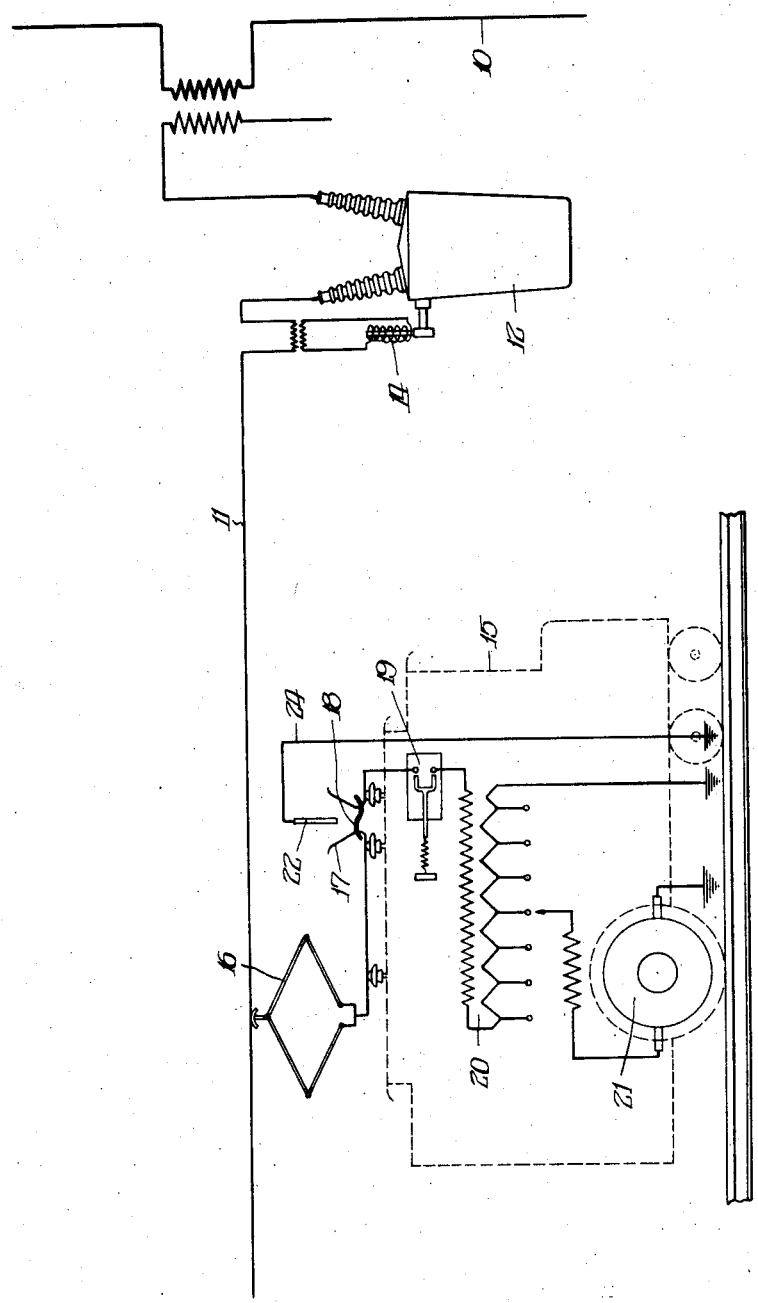

1,769,091

UNITED STATES PATENT OFFICE

ALFRED WICHERT, OF MANNHEIM-NEUOSTHEIM, GERMANY, ASSIGNOR TO A. G. BROWN BOVERI & CIE., OF BADEN, SWITZERLAND, A JOINT-STOCK COMPANY OF SWITZERLAND

PROTECTION OF ELECTRICAL MOTOR CARS

Application filed October 8, 1926, Serial No. 140,409, and in Germany October 16, 1925.

This invention relates to the protection of electrical apparatus against overloads. It finds one application in the protection of electric motor vehicles against overloads resulting from short circuits from the power line.

The general object of the invention is the provision of adequate protection against overloads for electrical apparatus in instances where limitations of space or permissible weight prevent the installation of protective gear of adequate size in immediate association with the apparatus to be protected.

Another object is the provision of protection for electrical apparatus in installations in which it may not be feasible to employ fuses in the immediate environs of the protected apparatus.

A further object is the provision of effective protection for the operating apparatus of electric railway motor cars or locomotives without involving the installation of heavy circuit breakers or protective gear on the vehicle and without exposing the apparatus or individuals carried on the vehicle to the effects occasioned by the blowing of fuses carrying high tension current.

Other and further objects of the invention will be pointed out or indicated hereinafter or will be apparent to one skilled in the art upon an understanding of the invention or its employment in practice.

For the purpose of this application I show and describe herein one arrangement of apparatus wherein the invention is employed in the protection of electric railway motor cars or locomotives, but it is to be understood that this is presented for purpose of illustration only and is not to be accorded any interpretation having the effect of limiting the claims short of the true and most comprehensive scope of the invention in the art.

In the drawing forming a part of this specification the figure represents a diagrammatic illustration of portions of an electric railway power line and a vehicle supplied therefrom, together with protective gear.

For the protection of motor cars of locomotives on electric railways, it is necessary to design the protective gear, such as the circuit breakers whose function it is to isolate the electrical system of the vehicle from the power line, to handle the maximum short circuit power to which the power line may be subjected. This depends principally on the size and remoteness of the power stations supplying the railway, rather than upon the power ratings of the operating apparatus on the vehicle. It would result frequently, therefore, in the necessity of using very large and heavy circuit breakers on the vehicles, and in the case of small coaches or locomotives it would produce uneconomic results from the standpoint of space consumption and weight as well as cost. The use of fuses instead of circuit breaking gear presents various difficulties, among them being the disturbing noise and shock from the blowing of a fuse, to which it is undesirable to expose passengers or operators in an enclosed compartment such as a railway coach, and the fact that the ordinary type of fuse does not give reliable protection against short circuits when the power dealt with is so large. The action of the ordinary fuse is simply to isolate the electrical equipment in the vehicle, or a portion thereof, from the contact wire when a short circuit occurs within the vehicle itself. The present invention not only accomplishes this purpose but also prevents damage to the interior of the vehicle or shock to passengers, and affords in addition proper protection for the vehicle from power surges or overloads occasioned by disturbances elsewhere in the supply system.

The nature of the invention may be readily ascertained by a consideration of the illustrative embodiment indicated in the drawing. In this arrangement, let it be understood that the numeral 10 designates a supply line or bus-bar from which is supplied a feeder represented by the contact wire 11 of an electrical railway line. At a proper location this feeder is protected by apparatus whereby it may be isolated from the source of supply, such apparatus being indicated by the oil circuit breaker 12 having the automatic overload tripping device 14 effective to accomplish the opening of the circuit breaker upon occurrence of an overload on the feeder. This appartus, being a stationary installation, may be designed in the proper size and with the requisite safety factors to afford adequate and certain protection. The reference numeral 15 designates a motor coach or locomotive which is supplied from the feeder 11. It carries the collector 16 from which the high tension current is led across a horn gap arcing device 17 by a fuse 18. The horn gap device and fuse are positioned on the exterior of the vehicle where they are effectively segregated from the apparatus and persons in the latter. A circuit breaker 19 is provided on the vehicle, with suitable tripping gear which may be arranged to operate automatically upon the occurrence of a short circuit in the electrical system of the vehicle. The reference numeral 20 designates the tapping transformer carried on the vehicle for properly modifying the power to supply the motor 21. In association with the horn gap device 17, and in the path of the arc formed upon the blowing of the fuse 18, is located an earthing device 22 which is connected to ground through a heavy conductor 24 effectively insulated and offering as small resistance as possible.

Upon the occurrence of a predetermined overload on the high tension line of the vehicle, the fuse 18 will be blown, and the arc, traveling up the horn gap device 17, will reach the earthing device 22 and the current conducted to earth through the earthing conductor 24. This constituting in effect a grounding of the feeder 11, the tripping gear 14 will be brought into operation automatically, causing the circuit breaker 12 to open and the feeder 11 to be isolated from the supply line 10.

As the result of this arrangement, it is possible to equip the motor coach with comparatively small capacity circuit breakers designed with reference to the power ratings of the vehicle, and at the same time obtain, with saftey, adequate protection of the vehicle against maximum short circuit surges or overloads of the power system.

What I claim is:

In an electrical traction system, an electrical supply line having a ground-return, a supply switch for controlling said line and being operable to open the same upon occurrence of a grounded short-circuit condition thereof, a vehicle disposed for operation coextensively with said line, electrically-operated means carried by said vehicle for supplying motive power therefor and connected on one side to ground, means carried by said vehicle and providing an operating connection between said line and the other side of said motive means and including spaced arcing members and a fusible element normally connecting the latter and being operable upon occurrence of abnormal current conditions in said line to strike by a fusing action a connecting arc between said members, and means carried by said vehicle and disposed in spaced disconnected relation with respect to each of said arcing members but otherwise providing between the arcing member on the supply-line side a direct and independent connection between the latter and ground and being cooperable with such arcing member upon the striking of such arc to provide through and by way of such arc such grounded short-circuit condition of said line.

In testimony whereof I have hereunto subscribed my name at Berlin (Germany), on the 20th day of September, A. D. 1926.

ALFRED WICHERT.